US008715388B2

(12) United States Patent
Bai et al.

(10) Patent No.: US 8,715,388 B2
(45) Date of Patent: May 6, 2014

(54) PROCESS OF PRECIOUS METAL RECOVERY AND COLOR REMOVAL FROM AN ORGANOSILICON PRODUCT-CONTAINING LIQUID REACTION MEDIUM

(75) Inventors: He Bai, Vienna, WV (US); Scott Frum, Sistersville, WV (US)

(73) Assignee: Momentive Performance Materials, Waterford, NY (US)

( * ) Notice: Subject to any disclaimer, the term of this patent is extended or adjusted under 35 U.S.C. 154(b) by 18 days.

(21) Appl. No.: 13/097,333

(22) Filed: Apr. 29, 2011

(65) Prior Publication Data

US 2012/0272791 A1    Nov. 1, 2012

(51) Int. Cl.
  *C22B 9/00*  (2006.01)
(52) U.S. Cl.
  USPC ................. 75/710; 210/660; 423/22; 423/24
(58) Field of Classification Search
  USPC ........................ 75/710; 210/660; 423/22, 24
  See application file for complete search history.

(56) References Cited

U.S. PATENT DOCUMENTS

| | | | |
|---|---|---|---|
| 3,848,048 A | 11/1974 | Moore | |
| 4,388,279 A | 6/1983 | Quick | |
| 4,758,413 A | 7/1988 | Harris et al. | |
| 4,900,520 A * | 2/1990 | Behnam et al. | 75/426 |
| 4,935,550 A | 6/1990 | Miller et al. | |
| 5,114,473 A | 5/1992 | Abatjoglou et al. | |
| 5,208,194 A | 5/1993 | Pitchai et al. | |
| 6,013,187 A | 1/2000 | Burns et al. | |
| 6,015,920 A | 1/2000 | Schilling et al. | |
| 7,687,663 B2 | 3/2010 | Scaia et al. | |

FOREIGN PATENT DOCUMENTS

| | | |
|---|---|---|
| EP | 0367492 A2 | 5/1990 |
| FR | 2109908 A5 | 5/1972 |
| FR | 2765215 A1 | 6/1997 |

* cited by examiner

*Primary Examiner* — George Wyszomierski
*Assistant Examiner* — Tima M McGuthry Banks
(74) *Attorney, Agent, or Firm* — Dominick G. Vicari; Joseph S. Ostroff

(57) ABSTRACT

The present invention relates to a process for recovery of a precious metal catalyst from an organosilicon product-containing liquid reaction medium containing precious metal catalyst.

11 Claims, 7 Drawing Sheets

Top (Inlet): ~ 2% Pt Loading

Bottom (Outlet): ~ 0.15% Pt Loading

PROCESS OF PRECIOUS METAL RECOVERY AND COLOR REMOVAL FROM AN ORGANOSILICON PRODUCT-CONTAINING LIQUID REACTION MEDIUM

BACKGROUND OF THE INVENTION

The present invention relates to a process of precious metal catalyst recovery from an organosilicon product-containing liquid reaction medium containing precious metal catalyst. In particular, the present invention relates to a process of precious metal catalyst recovery from an organosilicon product-containing liquid reaction medium containing precious metal catalyst wherein the liquid reaction medium is produced by precious metal-catalyzed hydrosilation processes.

Hydrosilation reactions for syntheses of organosilicon, i.e., organosiloxane or organosilane, products are well known and generally involve catalyzed hydrosilation of an aliphatically unsaturated compound with a silane or a silicon polymer containing reactive silanic-hydrogen and/or hydrogen-siloxy units in the presence of a precious metal catalyst, e.g., platinum (Pt), rhodium and palladium. As a result, precious metal catalysts remain in organosilicon product-containing reaction media, e.g., siloxane or silane streams, causing significant precious metal waste, high color in organosilicon products, and black particle formation due to slow precious metal precipitation causing customer complaints of organosilicon products such as cosmetic and personal use products.

Organosilane distillations produce silane heavy wastes in which precious metal catalysts such as platinum catalyst remain, causing significant precious metal waste therein as well.

In certain organosilicon products, there is a low color specification. For example, a hydrosilylation product of triethoxysilane with 1-octene can have a color of less than 30 pt-co. However, the existence of precious metal catalysts such as platinum in the product causes product color, i.e., having a color of about 30-60 pt-co. As a result, heavy distillation is needed to remove precious metals and to reduce product color. This additional heavy distillation step not only reduces product yield but also significantly increases final product cost.

Current methods do not provide for desirable precious metal catalyst recovery from an organosilicon product-containing liquid reaction medium containing precious metal catalyst, e.g., a liquid reaction medium from continuous siloxane copolymer unit or a continuous silane hydrosilation unit, before the liquid reaction medium is passed to product storage containers. Further, current methods do not provide for desirable precious metal catalyst recovery from an organosilicon product-containing liquid reaction medium containing precious metal catalyst, e.g., a liquid reaction medium from a continuous silane distillation unit, before the liquid reaction medium is passed to silane heavy waste storage containers.

SUMMARY OF THE INVENTION

The present invention is process for recovery of a precious metal catalyst from an organosilicon product-containing liquid reaction medium containing precious metal catalyst which has the steps of:

a) contacting the liquid reaction medium containing precious metal catalyst with a precious metal adsorbent under precious metal adsorption conditions to adsorb precious metal thereon;

b) separating precious metal adsorbent from the liquid reaction medium; and, c) recovering adsorbed precious metal from said precious metal adsorbent.

DETAILED DESCRIPTION OF THE INVENTION

Figure 1:
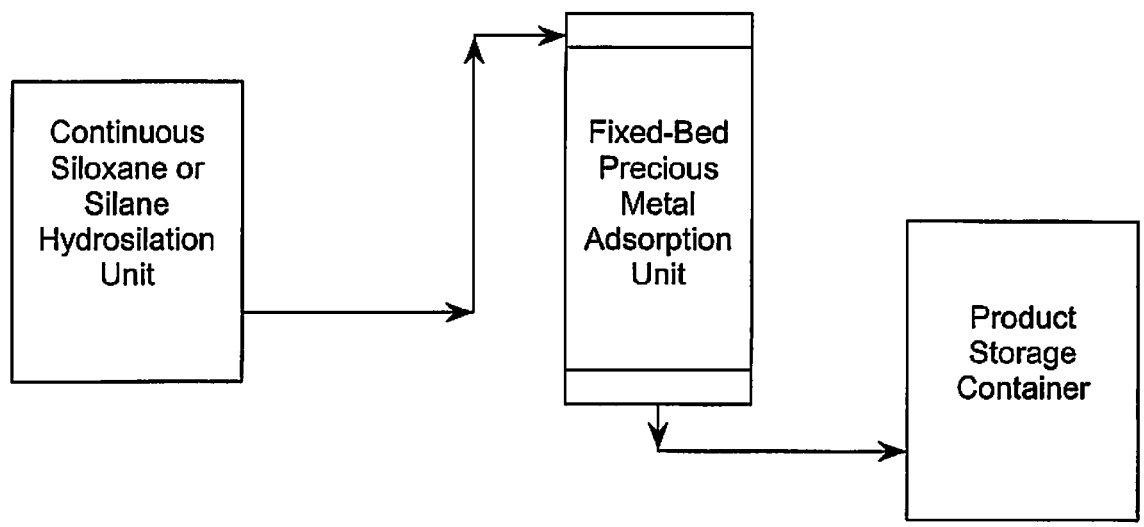
FIG. 1 schematically illustrates a flow sheet of a precious metal recovery process from a siloxane copolymer unit or a silane hydrosilylation unit.
Figure 2:
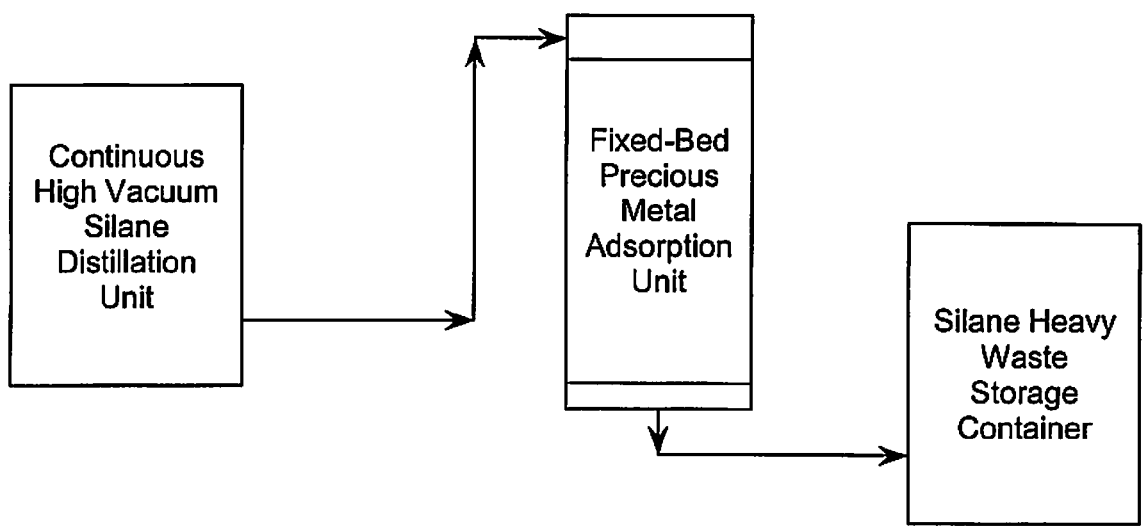
FIG. 2 schematically illustrates a flow sheet of a precious metal recovery process from a silane distillation unit.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The present invention provides a process for significant precious metal recovery from an organosilicon product-containing liquid reaction medium produced from hydrosilation reaction or from silane heavy wastes after silane distillation containing precious metal catalyst. Further, the present invention provides for recovery from an organosilicon product-containing liquid reaction medium to significantly reduce the product color and precious metal precipitation of organosilicon products. Further, for certain organosilicon products where distillation is required only for removing precious metal and reducing product color, the present invention provides a process of precious metal recovery and product color removal and thus eliminates the costly distillation step, thus increasing product yield and significantly reducing final product cost. Further, the present invention provides a commercially feasible and economical process for accomplishing the above objectives. Still further, the present invention provides for recovery of precious metal catalyst in a high yield suitable for reuse in catalytic or other reactions.

Accordingly, it is an object of this invention to provide a process for recovery of a precious metal catalyst from an organosilicon product-containing liquid reaction medium containing precious metal catalyst, the process comprising contacting the liquid reaction medium containing precious metal catalyst with a precious metal adsorbent under precious metal adsorption conditions to adsorb precious metal thereon; separating precious metal adsorbent from the liquid reaction medium; and, recovering adsorbed precious metal from the precious metal adsorbent.

The present invention provides a process for precious metal catalyst recovery from an organosilicon product-containing liquid reaction medium containing precious metal catalyst by adsorbing the precious metal via a fixed-bed precious metal adsorption unit which is placed in-between a source of organosilicon product-containing liquid reaction medium containing the precious metal catalyst, e.g., a continuous siloxane copolymer unit or a continuous silane hydrosilation unit, and a product storage container. In addition, the present invention provides for advantageous precious metal catalyst recovery from an organosilicon product-containing liquid reaction medium containing precious metal catalyst via a fixed-bed precious metal adsorption unit placed in-between a source of organosilicon product-containing liquid reaction medium containing the precious metal catalyst, e.g., a silane distillation unit, and a silane heavy waste storage container.

According to an embodiment of the invention, upon installing a fixed-bed precious metal adsorption unit directly between a source of organosilicon product-containing liquid reaction medium containing a precious metal catalyst, e.g., a continuous siloxane copolymer unit, a continuous silane hydrosilation unit or a continuous silane distillation unit, and a product or waste storage container, organosilicon product-containing liquid reaction medium is passed from the source of organosilicon product-containing liquid reaction medium and is directly fed into a fixed-bed precious metal adsorption unit. The fixed-bed precious metal adsorption unit and pipes between the source of the organosilicon product-containing liquid reaction medium and fixed-bed precious metal adsorption unit are insulated to maintain the high temperature of the liquid reaction medium in order to adsorb precious metal onto the adsorbent. One example material that can be used for insulation is calcium silicate. Thus, no heating source is required for the fixed-bed adsorption unit and no additional heating is needed of the liquid reaction medium once it leaves the continuous hydrosilylation or distillation units. This process minimizes the manufacturing-related cost for precious metal recovery. A fixed-bed adsorption operation is an operation in which additive material (e.g., precious metal adsorbent) is placed in and remains stationary in an adsorption unit (e.g., a cylindrical adsorption column) to adsorb precious metals.

According to an embodiment of the invention, the liquid reaction medium resulting from a pass through of a precious metal adsorption bed is re-contacted at least once with precious metal adsorbent at precious metal adsorption conditions to adsorb precious metal thereon; separating precious metal adsorbent from the liquid reaction medium; and, recovering adsorbed precious metal from said precious metal adsorbent. The contacting and re-contacting steps can be carried out in a continuous manner by passing the liquid reaction medium through one or more fixed precious metal recovery adsorbent beds which include at least one precious metal adsorbent until the desired clarification and decolorization is completed. Such a continuous operation may use more than one precious metal adsorption units, e.g., a lead bed and lag beds, to adsorb the precious metal to achieve the desired color and amount of platinum recovery resulting in a treated liquid reaction medium having a low precious metal content, low color and/or low precious metal precipitation of the precious metal, i.e., less black particles therein. The treated liquid reaction medium is then placed into storage containers.

According to an embodiment of the present invention, the precious metal adsorbent is an adsorbent with a polymer backbone matrix, an inorganic backbone matrix or a mixture thereof. Adsorbents with a polymer backbone matrix selected to adsorb the desired precious metal from the liquid reaction medium include ion-exchange resins or chelating resins. Adsorbents with an inorganic backbone matrix include silica gel, functionalized silica gel such as PHOSPHONICS, activated carbon and inorganic nanoparticles (e.g., $Fe_3O_4$). PHOSPHONICS silica gel is described in U.S. Publication No. 2009/0098082, EP Patent No. EP 1,786,850 and International Publication No. WO 2006/013060. Adsorbents with inorganic backbone matrices are preferable for excellent thermal and long-term stability in the adsorbent beds. Adsorbents can have specific functional groups which are selected based on the desirable affinity with precious metals. Examples of specific functional groups include mercapto (—SH), sulfide (—S—), amino (including primary, secondary, or tertiary amine), or a mixture thereof. Thus, the adsorbents can be efficient for recovery of precious metals in various forms such as ionic forms or elements, solution or colloidal.

The liquid reaction medium containing precious metal to be treated can be a product of a reaction such as hydrosilation and hydroformylation, which is catalyzed by a precious metal catalyst. Hydrosilation reactions for syntheses of organosilicon, i.e., organosiloxane or organosilane, products are well known and generally involve catalyzed hydrosilation of an aliphatically unsaturated compound with a silane or a silicon polymer containing reactive silanic-hydrogen and/or hydrogen-siloxy units in the presence of a precious metal catalyst, e.g., platinum, rhodium and palladium. The organosilicon product-containing liquid reaction medium containing precious metal can be provided from a continuous siloxane copolymer unit, a continuous silane distillation unit or a continuous silane hydrosilation unit. Hydroformylation reactions for synthesis of aldehydes are also well known and generally involve treatment of alkenes using a precious metal catalyst. The present process can also be applied to a commercially available organosilicon product which has undesirable color or amounts of precious metal catalyst which can be recovered due to entrainment thereof. The liquid reaction medium can be the crude liquid product of a reaction effected in the presence of one or more of the catalysts, such as the crude product mixture obtained from platforming reactions, the hydrogenation of fats and oils, hydrogenation reactions, oxidation of higher alcohols, ring opening polymerization reactions, and others which contain up to 5,000 ppm of one or more of a precious metal catalyst.

Hydrosilation reactions can generally be carried out at a temperature between about 25° C. and about 200° C., preferably between about 50° C. and about 120° C. under a pressure of from about 0 psig to about 500 psig for a period of from about 5 minutes to several days, in the presence of a small amount of precious metal catalyst, e.g. between about 1 ppm and about 5,000 ppm, which is entrained in the resulting organosilicon product-containing liquid reaction medium.

As discussed above, the resulting liquid reaction medium from the reactions described above or waste streams after heavy silane distillation are contacted with a precious metal adsorbent under precious metal adsorption conditions to adsorb precious metal thereon. The adsorbent can be placed in one or more fixed-bed precious metal adsorption units, e.g., one or more columns containing functionalized silica gel for precious metal adsorption, for the liquid reaction medium to pass through at a desired rate and/or with a desired residence time of the liquid reaction medium in the adsorption bed(s) for optimal precious metal adsorption. During contact with a precious metal adsorbent, the precious metal catalyst entrained in the liquid reaction medium is effectively removed by bonding to the adsorbent. In one embodiment of the invention, a fixed-bed adsorbent unit is connected to and placed directly after the source of the liquid reaction medium, e.g., a continuous high vacuum silane distillation unit, continuous siloxane copolymer unit or continuous silane hydrosilation unit, such that the liquid reaction medium passes directly to the fixed absorption bed and precious metal is obtained on the adsorbent without costly heating needed.

Precious metal adsorption conditions can include a temperature of the liquid reaction medium within the precious metal adsorption unit of between about ambient and about 200° C., about 25° C. and about 200° C., most preferably between about 40° C. and about 120° C.

Precious metal adsorption conditions can include a pressure range of from about atmospheric to about 100 atmospheres. In addition, precious metal adsorption conditions include a residence time of the liquid reaction medium to be contacted with said precious metal adsorbent sufficient to achieve a satisfactory amount of adsorption of precious metal onto the precious metal adsorbent, e.g., about 1 minute to about 24 hours.

Generally, the viscosity of the organosilicon product-containing liquid reaction medium containing precious metal catalyst to be treated is in a range of about 0 cSt to about 1000 cSt at 25° C., preferably about 0 cSt to about 500 cSt at 25° C., and most preferably about 0 cSt to about 200 cSt at 25° C. Treatment of low viscosity liquid reaction media is more effective for precious metal recovery than treatment of high viscosity liquid reaction media since those liquid reaction media with low viscosities diffuse into the pores of adsorbent material, e.g., functionalized silica gels, more readily to achieve desirable precious metal recovery. A liquid reaction medium having low viscosity is defined as a medium having a visocity with a range of about 0 cSt to about 200 cSt at 25° C. A liquid reaction medium with high viscosity is defined as a medium having a viscosity above 1000 cSt at 25° C.

In one embodiment of the present invention, the organosilicon product-containing liquid reaction medium containing precious metal catalyst is flowed directly from continuous siloxane copolymer unit, continuous silane hydrosilylation or continuous silane distillation units to one or more fixed adsorption beds containing precious metal adsorbent for in-situ precious metal recovery by contacting the liquid reaction medium to the precious metal adsorbent. Thus, the one or more fixed adsorption beds is connected directly to the continuous siloxane copolymer unit, continuous silane hydrosilylation or continuous silane distillation units for precious metal recovery from organosilicon product-containing liquid reaction media (e.g., siloxane or silane products or silane heavy wastes). No dilution solvent is needed in the present invention. The process of the present invention is much more advantageous compared to batch-wise recovery processes since there are high manufacturing-related recovery costs associated with the costly and time-consuming batch-wise recovery process (e.g., additional batch kettle cycle time), which will diminish the benefit of precious metal cost savings. In addition, the process of the present invention where no dilution solvent is needed is much more advantageous compared to processes where dilution solvent will be needed since the high recovery costs associated with solvent consumption and final product regeneration will diminish the benefit of precious metal cost savings. The organosilicon product-containing liquid reaction medium, e.g. silicone products or silane heavy wastes, flowing out of continuous hydrosilylation units or continuous distillation units are directly passed through the at least one fixed-bed adsorption units for precious metal recovery, without change of existing continuous hydrosilylation and continuous distillation equipments. The recovery process is continuous. Thus, there are almost no manufacturing-related recovery costs in addition to the adsorbent material costs associated with the process of the present invention, after the initial installation and investment of the precious metal adsorption unit. Advantages of the process of the present invention include: (1) recovery with very low manufacturing-related recovery costs, (2) no costly heating needed for adsorbent bed recovery columns since the organosilicon product-containing liquid reaction media produced out of continuous hydrosilylation and continuous distillation units already have high temperatures suitable for recovery of precious metal, (3) the process of the present invention does not change the existing continuous hydrosilylation and continuous distillation processes and thus, the investments (e.g. fixed-bed installation) for modification of the existing processes can be minimized, and (4) high precious metal recovery and high precious metal loading on adsorbents can be obtained. As a result, the value of the recovered precious metal can be significantly higher than the cost of the adsorbents.

Upon the adsorbing precious metal on the precious metal adsorbent, precious metal recovery therefrom can be completed using well known methods such as leaching the adsorbent with an inorganic hydroxide solution, converting the precious metal group anions to a soluble salt and regenerating the catalyst by contacting the salt solution with a cationic exchange resin. Alternatively, the precious metal-loaded adsorbent can be incinerated such that the precious metal is recovered as elemental metal.

Precious metal catalysts that can be used and recovered by the process of this invention include palladium, rhodium, ruthenium, rhenium, and platinum, e.g., hexachloroplatinic acid, chloroplatinic acid, Karstedt catalyst and platinum halide. Further, the corresponding bromides and iodides of the platinum catalyst as well as the palladium, rhodium, ruthenium and rhenium counterparts of any platinum halide compounds and corresponding acids or mixtures of the catalysts, e.g., a mixture of hexachloroplatinic acid and hexachloropalladinic acid can be recovered. The precious metal catalysts recovered can be in solution or colloidal form.

EXAMPLES

Samples of a liquid reaction medium containing platinum catalyst were contacted with an adsorbent to evaluate desirable adsorption conditions for removing the solubilized platinum from the liquid reaction media. The precious metal adsorption in the Examples were completed in small-scale lab demonstration and thus, the fixed-bed unit, i.e., column, had a heating/cooling jacket to control the column temperature for precious metal recovery. In large commercial scale operations, heating would not be necessary since the organosilicon product-containing liquid reaction medium produced from sources of the media, e.g., continuous siloxane copolymer units, continuous silane distillation units or continuous silane hydrosilation units, would already have high temperatures suitable for adsorbing precious metal onto the adsorbent when passed through the fixed-bed precious metal adsorption unit for recovery of the precious metal. The following describes the specifications for the Fixed-Bed Precious Metal Adsorption Unit used for precious metal catalyst recovery in Examples 1-6:

The fixed-bed precious metal adsorption unit used a cylindrical column packed with PhosphonicS™ functionalized silica gels as adsorbent for fixed-bed platinum recovery.

One adsorption unit was used with a single pass of the liquid reaction medium through the adsorption unit.

The column had a heating/cooling jacket to control the column temperature for precious metal recovery.

Column Inner Diameter: 1 inch
Packing Length: 11 inches
Packing Volume: 141.6 cm$^3$
Weight of Packed Silica Gel: 62 grams
Packing Density: 0.438 g/cm$^3$
Void Space within Fixed Bed: 111.4 cm$^3$ (Voidage=78.7%)
Residence Time varied depending on Feeding Rate
Definitions of residence time, bed volume and recovery:

$$\text{Residence Time} = \frac{\text{Void Space in Fixed Bed Column}}{\text{Liquid Stream Feeding Rate}}$$

$$\text{Bed Volume } (BV) = \frac{\text{Total Weight of Treated Liquid Streams}}{\text{Weight of Packed Silica Gels}}$$

$$\text{Recovery} = \frac{\text{Initial Platinum Concentration in Solution} - \text{Final Platinum Concentration in Solution}}{\text{Initial Platinum Concentration in Solution}}$$

Case 1—Platinum Recovery Process between a Siloxane Manufacturing Unit and Product Storage Container:

Test 1—

Siloxane product treated: Siloxane-A (viscosity of about 19 cSt at 25° C.). Siloxane-A is a hydrosilylation product of silanic fluid MD'M with excess of polyether APEG-350-OMe, and was made in a continuous siloxane copolymer unit. The structure of MD'M:

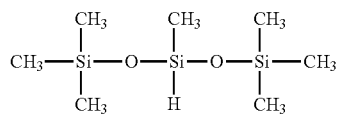

The structure of APEG-350-OMe:

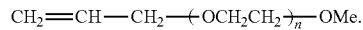

The concentration of the solubilized platinum in the product was analyzed using Inductively Coupled Plasma Mass Spectroscopy.

The platinum level and product color of Siloxane-A, which was obtained directly from a continuous siloxane copolymer unit, were measured without fixed-bed adsorption treatment:

Platinum level: 5.28 ppm
Product color: 145 pt-co

Examples 1A-1D

In Examples 1A-1D, the fixed-bed adsorption unit with the above-discussed specifications was used to treat Siloxane-A at a specific temperature and residence time. A fixed bed adsorption unit with the above-discussed specifications was placed directly between a Siloxane-A feeding reservoir (i.e., the continuous siloxane manufacturing unit in a large-scale commercial production) and a product storage container for the siloxane liquid reaction medium to continuously pass through the fixed bed adsorption unit for precious metal recovery. Example 1A used a relatively high temperature and relatively long residence time for recovery study. Example 1B used a shorter residence time compared to Example 1A to study the residence time effect. Example 1C used a lower temperature compared to Example 1B to study the temperature effect. Example 1D used the same conditions as Example 1B, but the experiments were carried out with an extensive period of time to study the durability of the adsorbent and evaluate the platinum loading achievable on the adsorbent.

Example 1A

Platinum recovery from product Siloxane-A with fixed-bed adsorption treatment was completed at 75° C. and with a residence time of 74 minutes. In this experiment, 8.8 Kg (BV=142) of Siloxane-A was treated by the fixed-bed adsorption unit with the above-discussed specifications, and the results were:

Platinum level after treatment: 0.37 ppm (Recovery=93.0%)
Product color after treatment: 40 pt-co

Example 1B

Recovery from Siloxane-A with fixed-bed adsorption treatment at 75° C. and with a shorter residence time of 16 minutes compared to Example 1A. In this screening experiment, 40.3 Kg (BV=650) of Siloxane-A was treated by the fixed-bed adsorption unit with the above-discussed specifications, and the results were:

Platinum level after treatment: 1.07 ppm (Recovery=79.7%)
Product color after treatment: 50 pt-co

Example 1C

Recovery from Siloxane-A with fixed-bed adsorption treatment with a residence time of 16 minutes and at a lower temperature of 25° C. compared to Examples 1B. In this experiment, 462 g (BV=7) of Siloxane-A was treated by the fixed-bed adsorption unit with the above-discussed specifications, and the results were:

Platinum level after treatment: 2.98 ppm (Recovery=43.6%)
Product color after treatment: 90 pt-co As shown from the above data, a higher fixed-bed temperature is desirable for platinum recovery and product color removal. Increased liquid stream residence time in a fixed-bed has a desirable effect on platinum recovery and product color removal.

Example 1D

Figure 3:
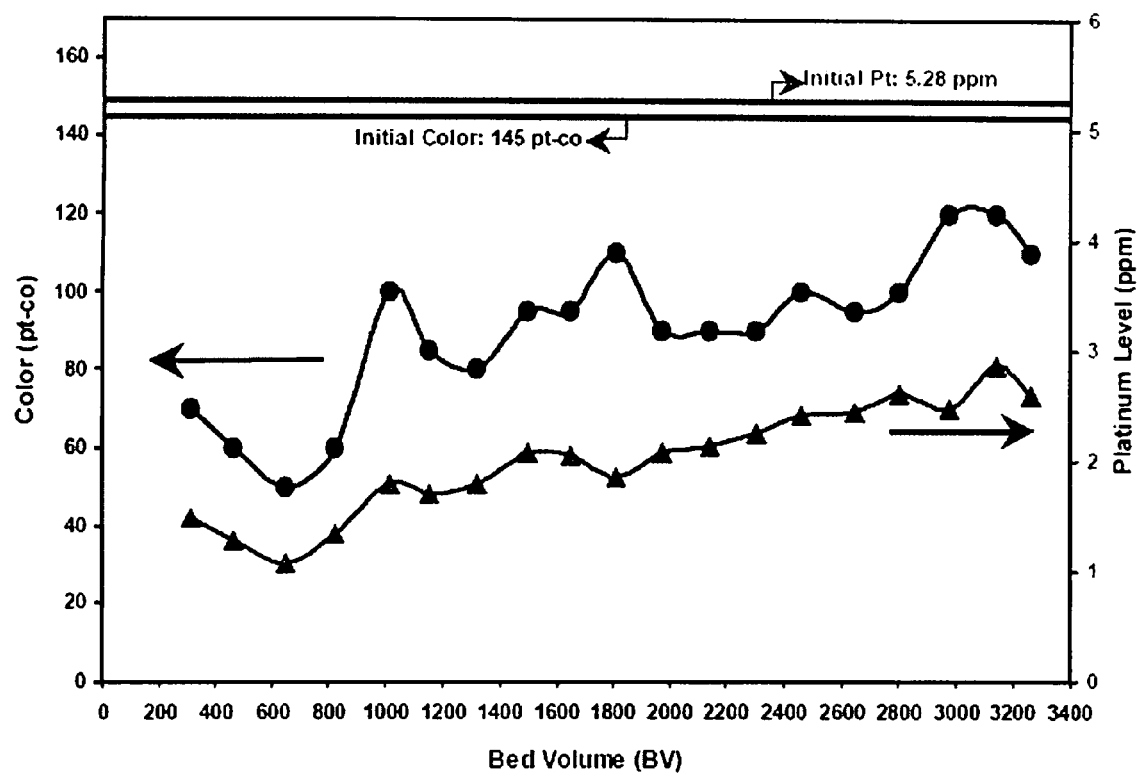
FIG. 3 shows long-term fixed-bed platinum recovery results from Siloxane-A at 75° C. and residence time of 16 minutes.

FIG. 3 shows the long-term fixed-bed volume testing data of Siloxane-A (completed at 75° C. with a short residence time of 16 minutes in an adsorption unit with the specification as discussed above). In this long-term experiment, Siloxane-A treatment was continued for an extensive period of time with a total of 202 Kg of Siloxane-A treated by passing through the column (BV=3260) to test the durability of the adsorbent and evaluate the platinum loading achievable on the adsorbent. Longer durability of the adsorbent and higher platinum loading on the adsorbent will make the process more economical. For example, the final loaded platinum value on adsorbents must be higher compared to the cost of adsorbents before the platinum-saturated adsorbents in the fixed-bed adsorption unit are removed and the unit is repacked with fresh adsorbents to make the process beneficial and economical. The concentration of the solubilized platinum in the product was analyzed using Inductively Coupled Plasma Mass Spectroscopy, and the platinum recovery and color results were real-time data, i.e., at a specific BV, not the average of the entire period, as shown in FIG. 3.

FIG. 3 shows that even with a shorter residence time (i.e., 16 minutes), at the earlier stage (e.g., BV<800) of the long-term experiment, the silica gels showed 75% or higher platinum removal from Siloxane-A. In addition, the color of Siloxane-A dropped from about 145 pt-co down to about 50-60 pt-co. At the BV of 650, platinum level after treatment was 1.07 ppm (Recovery=79.7%) and product color after treatment was about 50 pt-co (real-time data at the BV of 650 shown in FIG. 3).

Figure 4:
FIG. 4 shows platinum loading distribution on silica gels after a long-term fixed-bed treatment of Siloxane-A.

With the increase of BV, the silica gels became platinum loaded. Thus, there was less platinum recovery and less color removal. For example, after passing 82 Kg (total accumulated amount) of Siloxane-A through the adsorption unit (with 62 g of adsorbent packing) with a bed volume of 1320. The results were:
Platinum level after treatment: 1.80 ppm (Recovery=65.9%)
Product color after treatment: 80 pt-co
(real-time data at the BV of 1320 shown in FIG. 3)
After passing 164 Kg (total accumulated amount) of Siloxane-A through the adsorption unit (BV=2640), the results were:
Platinum level after treatment: 2.44 ppm (Recovery=53.8%)
Product color after treatment: 95 pt-co
(real-time data at the BV of 2640 shown in FIG. 3)
Even at the BV of 3260 (the BV value at the termination of the experiment), the fixed-bed adsorption unit still showed a platinum recovery as high as 50%, and a color removal from 145 pt-co down to 110 pt-co. In total, 202 Kg of Siloxane-A product was flowed through the fixed-bed adsorption unit (62 g of adsorbent packing) with the above-discussed specifications. The total bed volume was 3260. The average platinum recovery and color results during the entire run were:
Average platinum level after treatment: 1.97 ppm (Recovery=62.7%)
Average color after treatment: 80 pt-co After the long-term bed volume tests, platinum loading distribution was observed on silica gels (FIG. 4). A high platinum loading of 1.72% was obtained on silica gels at the inlet section of the fixed-bed adsorption unit. Higher platinum loading occurred at the inlet section over the outlet section since the packed silica gels at the fluid inlet section could adsorb more platinum from the platinum-containing liquid reaction medium flowing through the adsorption unit and the packed silica gels at the fluid outlet section adsorbed platinum from a more platinum-depleted liquid reaction medium.

In commercial productions with longer residence time, improved platinum recovery and product color reduction results can be achieved. In addition, with multi-beds (i.e., lead bed and lag beds) designs, higher platinum loading on the beds can be achieved.

Test 2—

Siloxane product treated: Siloxane-B (viscosity of about 260 cSt at 25° C.). Siloxane-B is a hydrosilylation product of silanic fluid $MD_{15.3}D'_{5.7}M$ with excess of polyether APEG-350-OH, made in continuous siloxane copolymer unit. The structure of $MD_{15.3}D'_{5.7}M$:

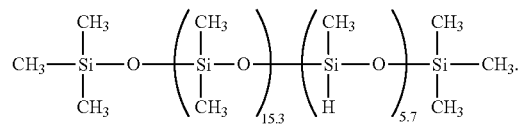

The structure of APEG-350-OH:

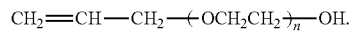

The concentration of the solubilized platinum in the product was analyzed using Inductively Coupled Plasma Mass Spectroscopy.

The platinum level and product color of Siloxane-B, which was obtained directly from a continuous siloxane copolymer unit, were measured without fixed-bed adsorption treatment:
Platinum level: 6.09 ppm
Product color: 140 pt-co Examples 2A and 2B In Examples 2A and 2B, the fixed-bed adsorption unit with the above-discussed specifications was used to treat Siloxane-B at a specific temperature and residence time. A fixed bed adsorption unit with the above-discussed specifications was placed directly between a Silxoane-B feeding reservoir (i.e., the continuous siloxane manufacturing unit in a large-scale commercial production) and a product storage container for the siloxane liquid reaction medium to continuously pass through the fixed bed adsorption unit for precious metal recovery. Example 2A used a relatively short residence time for recovery study. Example 2B used a longer residence time compared to Example 2A to study the residence time effect.

Example 2A

Platinum recovery from product Siloxane-B with fixed-bed adsorption treatment was completed at 75° C. and with a residence time of 23 minutes. In this experiment, 981 g (BV=16) of Siloxane-B was treated by the fixed-bed adsorption unit with the above-discussed specifications, and the results were:
Platinum level after treatment: 4.36 ppm (Recovery=28.4%)
Product color after treatment: 130 pt-co Example 2B Platinum recovery from product Siloxane-B with fixed-bed adsorption treatment was completed at 75° C. and with a longer residence time of 80 minutes compared to Example 2A. In this experiment, 492 g (BV=8) of Siloxane-B was treated by the fixed-bed adsorption unit with the above-discussed specifications, and the results were:
Platinum level after treatment: 3.94 ppm (Recovery=35.3%)
Product color after treatment: 130 pt-co As evident from the data above, for this relatively high viscosity stream, even with a longer residence time of 80 minutes, the platinum recovery and color removal results were less desirable compared to the Examples in Test 1. For example, the results in Example 2B (i.e., platinum level: 3.94 ppm, recovery: 35.3% and product color 130 pt-co) were less desirable compared to the results in Example 1A (i.e., platinum level: 0.37 ppm, recovery: 93.0% and product color 40 pt-co) even though similar temperature and residence time were used in these two examples. The reason is that the siloxane media in Example 2B had a higher viscosity (260 cSt at 25° C.) compared to the siloxane fluid used in Example 1A (19 cSt at 25° C.). This suggested that the process of the present invention is more desirable for precious metal recovery from organosilicon product-containing liquid reaction medium containing precious metal catalyst having a relatively low viscosity (e.g., Examples in Test 1) compared to media having a relatively high viscosity (e.g., Examples in Test 2).

Test 3—

Siloxane product treated: Siloxane-C (viscosity of about 2.88 cSt at 25° C.). Siloxane-C is a hydrosilylation product of silanic fluid MD'M (defined above) with 1-octene. The concentration of the solubilized platinum in the product was analyzed using Inductively Coupled Plasma Mass Spectroscopy.

The platinum level and product color of Siloxane-C, which was obtained directly from a siloxane manufacturing unit, were measured without fixed-bed adsorption treatment:
Platinum level: 2.05 ppm
Product color: 26 pt-co Example 3

In Example 3, the fixed-bed adsorption unit with the above-discussed specifications was used to treat the Siloxane-C at a specific temperature and residence time. A fixed bed adsorption unit with the above-discussed specifications was placed directly between a Siloxane-C feeding reservoir (i.e., the siloxane manufacturing unit in a large-scale commercial production) and a product storage container for the siloxane liquid reaction medium to pass through the fixed bed adsorption unit for precious metal recovery.

Platinum recovery from product Siloxane-C with fixed-bed adsorption treatment was completed at 75° C. and with a residence time of 68 minutes. In this experiment, 2.4 Kg (BV=39) of Siloxane-C was treated by the fixed-bed adsorption unit with the above-discussed specifications, and the results were:
Platinum level after treatment: 0.04 ppm (Recovery=98.0%)
Product color after treatment: 3 pt-co As evident from the data above, excellent platinum recovery and product color removal were achieved for low viscosity liquid reaction media. The results in Example 3 were more desirable compared to Example 2B even though similar temperature and residence times were used in both examples due to the lower viscosity of the liquid reaction medium in Example 3 (i.e., 2.88 cSt at 25° C.) compared to the liquid reaction medium of Example 2B (i.e., 260 cSt at 25° C.). Further, the platinum recovery and product color removal results in Example 3 were more desirable compared to those of Example 1A even though similar temperature and residence times were used in both examples. Again, due to the lower viscosity of the liquid reaction medium used in Example 3 (i.e., 2.88 cSt at 25° C.) compared to the liquid reaction medium of Example 1A (i.e., 19 cSt at 25° C.).

Case 2—Platinum Recovery Process between a Silane Distillation Unit and Heavy Waste Storage Container:

Test 4—

Silane heavy waste treated: Heavy-A

Heavy-A waste is heavy waste generated by hydrosilylation of trimethoxysilane with allyl methacrylate and followed by distillation. UCON lubricant was used during distillation and remained in the heavy waste stream. Heavy-A waste had a viscosity of less than 80 cSt at 25° C. The concentration of the solubilized platinum in Heavy-A waste was analyzed using Inductively Coupled Plasma Mass Spectroscopy. The platinum level of Heavy-A waste which was obtained directly from a commercial continuous silane distillation unit was measured without fixed-bed adsorption treatment:
Platinum Level: 41 ppm Example 4

In Examples 4A and 4B, the fixed-bed adsorption unit with the above-discussed specifications was used to treat the Heavy-A waste at a specific temperature and residence time. A fixed bed adsorption unit with the above-discussed specifications was placed directly between a silane heavy waste reservoir (i.e., the continuous silane distillation unit in a large-scale production) and a heavy waste storage container for the waste to continuously pass through the fixed bed adsorption unit for precious metal recovery. Example 4A shows the data of recovery results at a specific temperature and residence time. In Example 4B, the experiments were carried out with an extensive period of time to study the durability of the adsorbent and evaluate the platinum loading achievable on the adsorbent.

Example 4A

The platinum level of Heavy-A waste was measured after fixed-bed adsorption treatment at 75° C. and with a residence time of 203 minutes. In this experiment, 744 g (BV=12) of Heavy-A waste was treated by the fixed-bed adsorption unit with the above-discussed specifications, and the result was:
Platinum level after treatment: <1 ppm (Recovery>98%)

Example 4B

Figure 5:
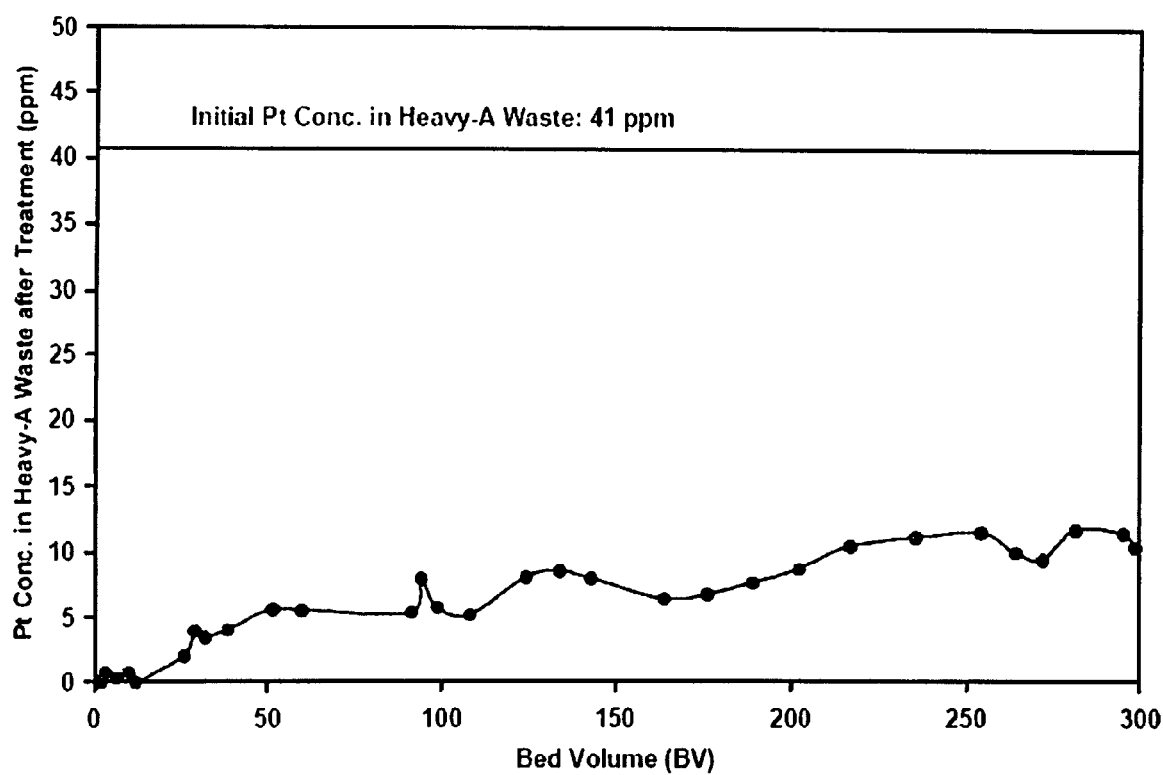
FIG. 5 shows long-term fixed-bed platinum recovery results from Heavy-A waste at the temperature of 75° C. and the residence time of 203-464 minutes.

FIG. 5 shows data from long-term fixed-bed volume testing of Heavy-A waste completed at 75° C. with a residence time of 203-464 minutes in an adsorption unit with the specifications discussed above. In this long-term experiment, Heavy-A waste treatment was continued for an extensive period of time with a total of 18.5 Kg of Heavy-A waste treated by passing through the column (BV=298) to test the durability of the adsorbent and evaluate the platinum loading on the adsorbent. Longer durability of the adsorbent and higher platinum loading on the adsorbent will make the process more economical. For example, the final loaded platinum value on adsorbents must be higher compared to the cost of adsorbents before the platinum-saturated adsorbents in the fixed-bed adsorption unit are removed and the unit is repacked with fresh adsorbents to make the process beneficial and economical. The concentration of the solubilized platinum in the waste stream was analyzed using Inductively Coupled Plasma Mass Spectroscopy. FIG. 5 shows the platinum recovery results in real-time data, i.e., at a specific BV, not the average of the entire period.

As shown in FIG. 5, at the earlier stage (i.e., BV<12) of the long-term experiment, the silica gels showed over 98% platinum removal from Heavy-A waste with a residence time of 203 minutes. The platinum level after treatment was <1 ppm at this earlier stage having BV<12.

With the increase of bed volume, the silica gels became platinum-loaded and thus platinum recovery became slightly lower, but still very high. For example, after passing 6.7 Kg of Heavy-A waste through the adsorption unit (with 62 g of silica gel packing) with a bed volume of 108:

Platinum level after treatment: 5.18 ppm (residence time=464 minutes; Recovery=87.4%)

Even at the BV of 298 (i.e., termination point of the experiment), the fixed-bed adsorption unit still showed a platinum recovery as high as 75%. After passing 18.5 Kg (accumulated amount) of Heavy-A waste through the absorption unit (BV=298):

Platinum level after treatment: 10.33 ppm (Residence time=464 minutes; Recovery=74.8%). Real-time data at the BV of 298 shown in FIG. 5.

In total, 18.5 Kg of Heavy-A waste was flowed through the adsorption unit (with 62 g of adsorbent packing) having the above-discussed specifications. The total bed volume was 298. The average platinum level after treatment: 6.14 ppm (Recovery=85%, average recovery during the entire run).

Figure 6:
FIG. 6 shows platinum loading distribution on silica gels after a long-term fixed-bed treatment of Heavy-A waste.

After the long-term bed volume tests, platinum loading distribution was observed on silica gels (FIG. 6). A high platinum loading of about 2% was obtained on silica gels at the inlet section of the fixed-bed adsorption unit. Higher platinum loading occurred at the inlet section over the outlet section since the packed silica gels at the fluid inlet section could adsorb more platinum from the platinum-containing liquid reaction medium flowing through the adsorption unit and the packed silica gels at the fluid outlet section adsorbed platinum from a more platinum-depleted liquid reaction medium. Platinum was then recovered from platinum loaded silica gels.

Test 5—

Silane heavy waste treated: Heavy-B

Heavy-B waste is heavy waste generated by hydrosilylation of triethoxysilane with 1-octene and followed by distillation in a continuous silane distillation unit. UCON lubricant was used during distillation and stayed in heavy waste stream. Heavy-B waste had a viscosity of less than 100 cSt at 25° C. The concentration of the solubilized platinum in the waste stream was analyzed using Inductively Coupled Plasma Mass Spectroscopy.

The platinum level and color of Heavy-B waste, which was obtained directly from a commercial continuous silane distillation unit, were measured without fixed-bed adsorption treatment:

Platinum Level: 50 ppm

Color of Waste: 1300 pt-co

Example 5

In Examples 5A and 5B, the fixed-bed adsorption unit with the above-discussed specifications was used to treat Heavy-B waste at a specific temperature and residence time. A fixed bed adsorption unit with the above-discussed specifications was placed directly between a silane heavy waste reservoir (i.e., a continuous silane distillation unit in a large scale commercial production) and a heavy waste storage container for the waste liquid reaction medium to continuously pass through the fixed bed adsorption unit for previous metal recovery. The process in Example 5B used a lower temperature compared to Example 5A to compare the effect of different temperatures.

Example 5A

The platinum level and color of Heavy-B waste were measured after fixed-bed adsorption treatment at 90° C. and with a residence time of 168 minutes. In this experiment, 1.9 Kg (BV=31) of Heavy-B waste was treated by the fixed-bed adsorption unit with the above-discussed specifications, and the results were:

Platinum level after treatment: 4.12 ppm (Recovery=91.8%)

Color of Waste after treatment: 70 pt-co

Example 5B

Recovery from Heavy-B waste with fixed-bed adsorption treatment with a residence time of 168 minutes and at a lower temperature of 40° C. compared to Example 5A was completed. In this experiment, 310 g (BV=5) of Heavy-B waste was treated by the fixed-bed adsorption unit with the above-discussed specifications, and the result was:

Platinum level after treatment: 14.81 ppm (Recovery=70.4%)

In summary, a higher fixed-bed temperature, such as 90° C. as in Example 5A resulted in 91.8% recovery, compared to 70.4% recovery in Example 5B which utilized a lower fixed-bed temperature of 40° C. Thus, a high fixed-bed temperature had a desirable effect on platinum recovery from silane heavy wastes. Further, with longer residence time and multi-beds usage as in commercial productions, additional platinum recovery would be expected.

Case 3—Platinum Recovery Process between a Silane Manufacturing Unit and Product Storage Container:

Test 6—

Silane product treated: Silane-A produced from a silane manufacturing unit. Silane-A is a silane product produced by hydrosilylation of triethoxysilane with 1-octene. Silane-A has a low viscosity of around 2 cSt at 25° C.

After hydrosilylation and light stripping, the purity, color and platinum level of Silane-A which was obtained directly from a commercial silane manufacturing unit were measured. Light stripping removed low boiling point components from Silane-A such as 1-octene and octene isomers to obtain a high purity Silane-A product, i.e., a high amount of octyltriethoxysilane. The results were:

Product Purity: 99.5%

Platinum Level: 5.21 ppm

Product color: 32 pt-co

After hydrosilation and light stripping, Silane-A already had very high purity. However, Silane-A showed high color, i.e., color above 30 pt-co, due to the presence of platinum. As a result, Silane-A needed a heavy distillation step for removing platinum and color by distilling the product and leaving platinum in a heavy stream to separate the Silane-A product and platinum. In addition, product yield was lost since some of the product remained in the heavy stream and became waste. As is well known, a distillation process requires significant energy consumption due to the heating and vacuum required, which causes significant additional manufacturing costs. Thus, the additional heavy distillation step reduced product yield and significantly increased final product cost.

Example 6

In Example 6, the fixed-bed adsorption unit with the above-discussed specifications was used to treat the Silane-A at a specific temperature and residence time.

The purity, color and platinum level of Silane-A were measured after fixed-bed adsorption treatment at 90° C. and with a short residence time of 11.7 minutes. Silane-A had a low viscosity of around 2 cSt at 25° C. In this experiment, 2 Kg (BV=32) of Silane-A was treated by the fixed-bed adsorption unit with the above-discussed specifications and the results were:

Product Purity: 99.5%

Platinum level after treatment: 0.95 ppm (Recovery=81.8%)

Product color after treatment: 3 pt-co

Figure 7:
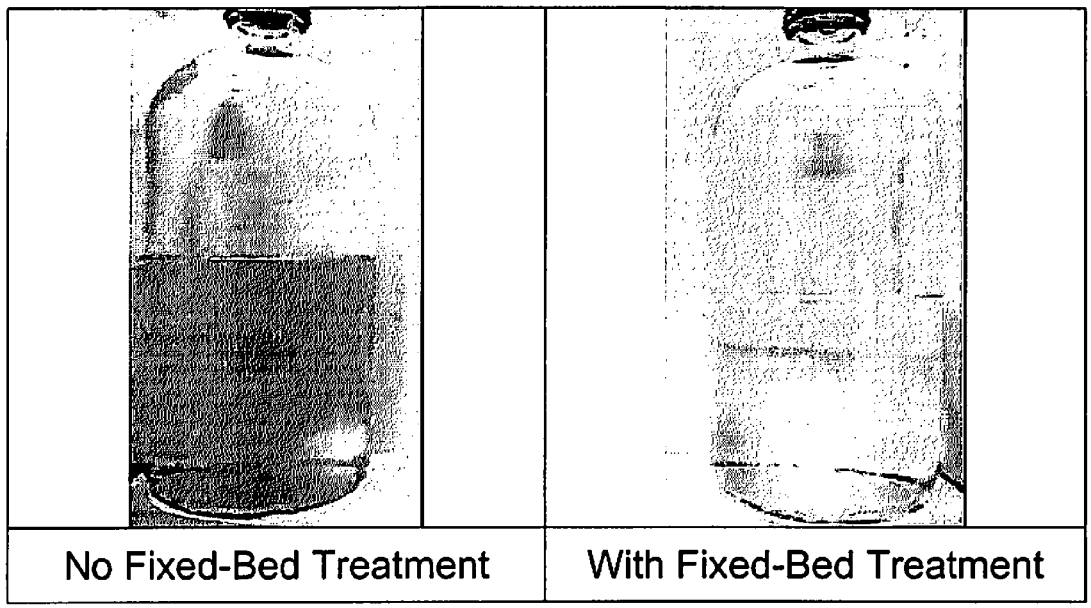
FIG. 7 shows Silane-A product appearance without fixed-bed treatment (left container) and with a fixed-bed treatment (right container) as discussed in Example 6.

The above-treated Silane-A showed much reduced color (See FIG. 7) due to platinum removal. Thus, a costly heavy distillation step was not needed and avoided. As a result, product yield was increased and product manufacturing cost was significantly reduced compared to manufacturing processes of Silane-A which include a heavy distillation step.

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

What is claimed is:

1. A process for recovery of a precious metal catalyst from an organosilicon product-containing liquid reaction medium containing precious metal catalyst in solution or colloidal form, the process comprising:
    a) contacting the liquid reaction medium containing precious metal catalyst with a precious metal adsorbent under precious metal adsorption conditions to adsorb precious metal thereon wherein the precious metal adsorbent is an adsorbent with an inorganic backbone matrix;
    b) separating precious metal adsorbent from the liquid reaction medium; and,
    c) recovering adsorbed precious metal from said precious metal adsorbent,
        wherein no dilution solvent is added to the organosilicon product-containing liquid reaction medium containing precious metal catalyst.

2. The process of claim 1 further comprising:
    d) re-contacting the liquid reaction medium resulting from the completion of step b) with precious metal adsorbent at precious metal adsorption conditions to adsorb precious metal thereon;
    e) separating precious metal adsorbent from the liquid reaction medium; and,
    f) recovering adsorbed precious metal from said precious metal adsorbent.

3. The process of claim 2 wherein recontacting the liquid reaction medium with said precious metal adsorbent is completed in a continuous manner.

4. The process of claim 1 wherein the liquid reaction medium in step (a) is provided directly from a continuous siloxane copolymer unit, a continuous silane distillation unit or a continuous silane hydrosilation unit.

5. The process of claim 1 wherein the precious metal is platinum, rhodium or palladium.

6. The process of claim 1 wherein the precious metal adsorbent comprises at least one of a functionalized silica gel and inorganic nanoparticles.

7. The process of claim 1 wherein said precious metal adsorption conditions includes a temperature range of from about ambient to about 200° C.

8. The process of claim 1 wherein said precious metal adsorption conditions includes a pressure range of from about atmospheric to about 100 atmospheres.

9. The process of claim 1 wherein said precious metal adsorption conditions includes a residence time of the liquid reaction medium to be contacted with said precious metal adsorbent of about 1 minute to 24 hours.

10. The process of claim 1 wherein the viscosity of the liquid reaction medium is about 1 cSt to about 500 cSt at 25° C.

11. The process of claim 1 wherein contacting the liquid reaction medium with said precious metal adsorbent is completed in a continuous manner.

* * * * *